United States Patent Office 2,735,214
Patented Feb. 21, 1956

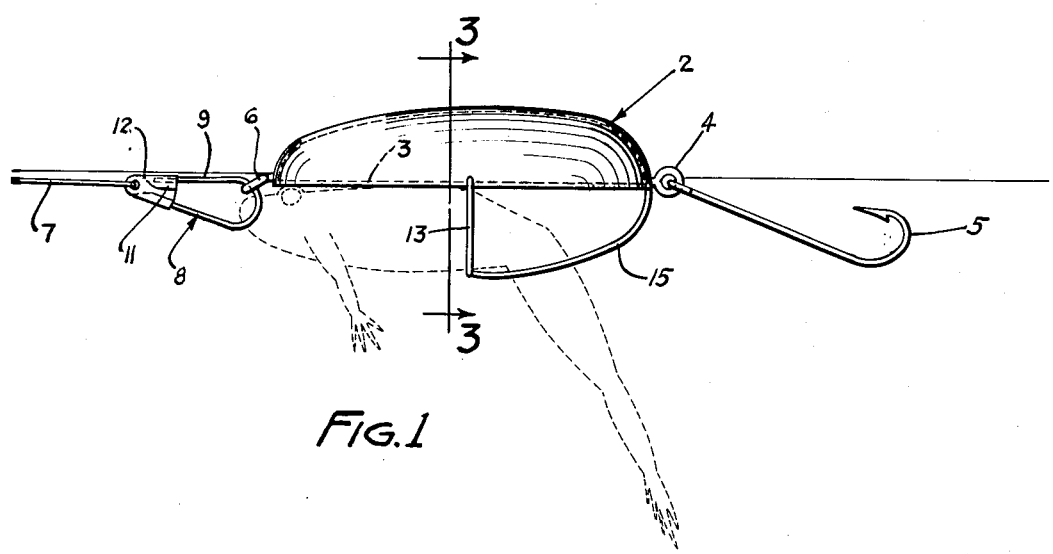
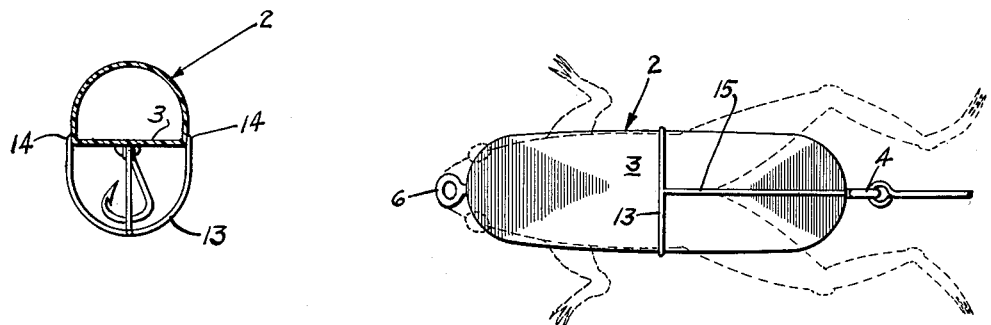

2,735,214

BAIT HOLDING FISH LURES

Gilbert Stenseng, Minneapolis, Minn.

Application August 20, 1953, Serial No. 375,329

4 Claims. (Cl. 43—44.4)

This invention relates to new and useful improvements in fish lures, and more particularly to such lures of the type commonly referred to as surface baits.

An object of the present invention is to provide a fish lure comprising a float having means thereon for supporting the body of a frog adjacent to the bottom wall of the float, whereby the frog is in a life-like position when the lure is drawn through the water.

A further object of the invention is to provide a fish lure comprising a transparent float having a flat bottom and provided at its rear end with a fishhook and having an eye at its forward end for attaching a fishline to the lure, and means depending from the bottom of the float for embracing a frog's body, thereby to retain the frog in a life-like position adjacent to the bottom wall of the float.

A further object is to provide a fish lure of the class described comprising a transparent float having a fish hook secured to its rear end and provided at its forward end with means for attaching a fish line thereto, said float having the terminals of a semi-circular member secured to the opposite sides thereof intermediately of its ends, and a longitudinally extending wire element having one end secured to the intermediate portion of said semi-circular member, and its opposite end of the rear end of the float, said element cooperating with said semi-circular member to support a frog in a life-like position in the water.

Other objects of the invention reside in the simple and inexpensive construction of the lure, as a whole, whereby it may be sold to the trade at a moderate price; in the provision of the longitudinally extending wire element in combination with the semi-circular member for supporting the frog in a life-like position in the water; and in the means provided for facilitating the operation of attaching a frog to the lure.

These and other objects of the invention and the means for their attainment will be more apparent from the following description taken in connection with the accompanying drawing.

In the accompanying drawing there has been disclosed a structure designed to carry out the various objects of the invention, but it is to be understood that the invention is not confined to the exact features shown, as various changes may be made within the scope of the claims which follow.

In the drawings:

Figure 1 is a side elevational view of my improved lure showing substantially the position of the lure when drawn through the water with a frog attached thereto, the frog being indicated in dotted lines;

Figure 2 is a bottom view of Figure 1, with the hook and line omitted; and

Figure 3 is a cross-sectional view on the line 3—3 of Figure 1.

The novel fish lure herein disclosed is shown comprising an elongated float of substantially semi-cylindrical transverse section, generally designated by the numeral 2. The float is constructed of a suitable transparent, plastic material, shown having a flat bottom wall 3 against which the body of a frog may be supported, as will subsequently be described.

Means, such as an eye 4, is suitably secured to the rear end of the float 2 for supporting a suitable fishhook 5 which may be in the form of a single hook or a gang hook. Secured to the forward end of the float 2 is a similar eye 6 which may be canted slightly downwardly as shown in Figure 1, to facilitate attaching a line 7 to the lure, as will next be described.

The fish line 7 is shown having a spring clip 8 secured thereto, having a spring-pressed leg 9 removably supported in a keeper 11 of a connecting element 12, well-known in the trade. To attach the lure to the clip 8, the removably supported leg 9 thereof is passed upwardly through the lower and upper lips of the frog's head and through the eye 6, and is then releasably engaged with the keeper 11, as will be understood by reference to Figure 1, whereby the frog and lure are simultaneously attached to the fish line.

Means is provided for retaining the frog's body in a life-like position in the water, and is shown comprising a substantially semi-cylindrical member 13 having its terminals suitably secured to the opposite sides of the float 2 by suitable means not shown, as indicated at 14 in Figure 3. A longitudinally extending wire element 15 has its forward end fixedly secured to the intermediate portion of the substantially semi-cylindrical member 13, and its rear end is suitably secured to the rear end of the float adjacent to the eye 4.

When applying a frog's body to the lure, the forward end or head of the frog is secured to the spring clip 8, as hereinbefore stated, and as shown in dotted lines in Figure 1. The rear legs of the frog are then inserted through the semi-cylindrical member 13 with the legs straddling the longitudinally extending member 15, as indicated by the dotted lines in Figures 1 and 2.

An important feature of the present invention resides in the fact that the success of the novel lure herein disclosed is not dependent upon the use of live frogs, as is usually the case when using conventional lures of this general type. When the frog is dead, its limp body, and particularly the legs of the frog's body, depend into the water in a manner very similar to that of a live frog floating on the surface of the water. In the present instance, the dead frog's body is supported in a life-like position on the surface of the water by the action of the float 2. Also by using a dead frog, the action of the lure on the surface of the water may readily be controlled by manual manipulation of the fish line by the fisherman.

The members 13 and 15 thus cooperate to support the frog's body adjacent to the bottom wall 3 of the float, whereby the frog's body assumes a life-like appearance in the water. Because of the transparency of the float 2, the float, when drawn through the water, becomes substantially invisible, whereby game and other fish are more likely to become attracted by the life-like position of the frog passing through the water.

The foregoing detailed description has been given for clearness of understanding only, and no unnecessary limitations should be understood therefrom, but the appended claims should be construed as broadly as permissible in view of the prior art.

I claim as my invention:

1. A fish lure comprising an elongated transparent float having a flat bottom, means at the forward end of the float for attaching a fish line thereto, a fish hook attached to the rear end of said float, and a substantially semi-circular member having its terminals secured to said float at the opposite sides thereof and intermediately of its ends, said member serving to embrace the body of a frog and retain it in a life-like position against the bottom of the float.

2. A fish lure according to claim 1, wherein a wire element has its forward end connected to the intermediate portion of the substantially semi-circular member and extends rearwardly therefrom in position to prevent the frog's body from rotating relatively to the float.

3. A fish lure comprising an elongated transparent float having a flat bottom, said float being substantially semi-cylindrical in transverse section, an eye secured to the forward end of the float adjacent to said bottom, a fish hook connected to the rear end of said float, a fish line having an attaching element secured thereto for detachably connecting the fish line to said eye, said attaching element also being adapted to pierce the lips of a frog to secure the frog to the lure, and means secured to said float and cooperating with said lure attaching means to hold the frog's body in position against the bottom of the float.

4. A fish lure according to claim 1, wherein an elongated wire element has its forward end secured to the intermediate portion of said substantially semi-circular member and its opposite end to the rear end of the float, said elongated element being arranged to be straddled by the rear legs of the frog and cooperating with said substantially semi-circular member to retain the frog in a life-like position against the bottom of the float.

References Cited in the file of this patent

UNITED STATES PATENTS

| | | |
|---|---|---|
| 841,951 | Evans | Jan. 22, 1907 |
| 1,452,377 | Hanselman | Apr. 17, 1923 |
| 1,461,246 | Lent | July 10, 1923 |
| 2,359,410 | Edwards | Oct. 3, 1944 |
| 2,582,646 | Moore | Jan. 15, 1952 |
| 2,634,540 | Nelson et al. | Apr. 14, 1953 |